(12) United States Patent
Anderson

(10) Patent No.: US 6,690,396 B1
(45) Date of Patent: Feb. 10, 2004

(54) SCANNABLE DESIGN OF AN EXECUTABLE

(75) Inventor: Glen J. Anderson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/472,344

(22) Filed: Dec. 27, 1999

(51) Int. Cl.[7] .................................................. G09G 5/00
(52) U.S. Cl. ...................... 345/764; 345/762; 345/767; 345/853; 382/217; 382/218; 382/276
(58) Field of Search ................................ 345/700, 762, 345/764, 835, 853, 763, 767; 382/205, 276, 190, 195, 209, 217, 218; 717/100, 104, 105, 109

(56) References Cited

U.S. PATENT DOCUMENTS

| | | | |
|---|---|---|---|
| 5,386,508 A | * | 1/1995 | Itonori et al. ............... 717/109 |
| 5,442,188 A | | 8/1995 | Brimbal et al. ............. 250/566 |
| 5,483,052 A | | 1/1996 | Smith, III et al. .......... 235/472 |
| 5,621,203 A | | 4/1997 | Swartz et al. ............... 235/462 |
| 5,644,408 A | | 7/1997 | Li et al. ..................... 358/448 |
| 5,656,369 A | | 8/1997 | Chess et al. ................ 428/331 |
| 5,666,214 A | | 9/1997 | MacKinlay et al. |
| 5,761,673 A | | 6/1998 | Bookman et al. ........... 707/104 |
| 5,793,972 A | | 8/1998 | Shane ......................... 709/219 |
| 5,805,933 A | | 9/1998 | Takahashi .................... 710/72 |
| 5,845,299 A | | 12/1998 | Arora et al. ................. 707/513 |
| 5,873,077 A | | 2/1999 | Kanoh et al. ................... 707/3 |
| 5,881,168 A | | 3/1999 | Takaoka et al. ............. 382/180 |
| 5,890,170 A | | 3/1999 | Sidana ........................ 707/501 |
| 5,893,127 A | | 4/1999 | Tyan et al. .................. 707/513 |
| 5,905,251 A | | 5/1999 | Knowles ................. 235/472.01 |
| 5,905,497 A | | 5/1999 | Vaughan et al. ............ 345/352 |
| 5,907,640 A | * | 5/1999 | Delean ........................ 382/276 |
| 5,911,010 A | | 6/1999 | Nakajima .................... 382/239 |
| 5,945,989 A | | 8/1999 | Freishtat et al. ............ 345/329 |
| 6,069,707 A | * | 5/2000 | Pekelman .................... 358/1.6 |
| 6,252,996 B1 | * | 6/2001 | Putnam ....................... 382/259 |
| 6,469,689 B1 | * | 10/2002 | Dow et al. .................. 345/156 |
| 6,469,797 B2 | * | 10/2002 | Sakai .......................... 358/1.15 |
| 6,484,048 B1 | * | 11/2002 | Hoshino et al. ............ 600/410 |

FOREIGN PATENT DOCUMENTS

WO    WO98/47082    10/1998

OTHER PUBLICATIONS

Myers BA and Zanden BV Environment for Rapidly Creating Interactive Design Tools The Visual Computer, Berlin, DE, 1992 vol. 8, No. 2, PP 94–116.

* cited by examiner

Primary Examiner—John Cabeca
Assistant Examiner—Cuong T. Thai
(74) Attorney, Agent, or Firm—Scott Charles Richardson; Chad W. Swantz; Suiter-West

(57) ABSTRACT

The present invention is directed to a system and method for scannable executable design. In a first aspect of the present invention, a system and method for developing an executable includes scanning an image and identifying a representation of a user interface element included in the scanned image. An executable is then formatted to include a user interface element corresponding to the identified representation of the user interface element. In a second aspect of the present invention, a representation of a user interface element suitable for scanning includes an object capable of being positioned on a medium, the object representing the user interface element. The object is capable of being identified as corresponding to the user interface element so that when the object is scanned, a executable is formatted to include the user interface element corresponding to the identified representation of the user interface element.

39 Claims, 8 Drawing Sheets

FIG. 7

APPLICATION

TAB 1

Applicant
Name (first middle last)
Social Security Number
Address (street)
(city) (state) (zip code)

Co-Applicant
Name (first middle last)
Social Security Number
Address (street)
(city) (state) (zip code)

Work phone Number
Home phone Number
E-mail address

Work phone Number
Home phone Number
E-mail address

Loan Information
Loan amount          Purchase Price
Property Type        Downpayment
Property Use         Downpayment from:
                     (savings)
                     (gift)
                     (sale of home)
Property Location
(street)
(city) (state) (zip code)

SCANNABLE DESIGN OF AN EXECUTABLE

FIELD OF THE INVENTION

The present invention generally relates to the field of the design of executables, and particularly to a system and method for scannable executable design.

BACKGROUND OF THE INVENTION

The Internet, and particularly the World Wide Web, has become a powerful resource and tool to users from a wide range of backgrounds and occupations. One force driving the ever-increasing growth of the Internet is the proliferation of personal and small business web pages. The content and functionality of these web pages are as varied as the minds used to create them. For example, a user may create a web page including everything from pictures of the family pet and vacation descriptions to e-commerce and the incorporation of very specialized and detailed knowledge on a wide range of topics, such as technical papers and doctoral theses. However, creation of a web page typically requires an understanding of basic computer operation and programming. The creation of links, home pages, entry of images, backgrounds, and the like may be foreign to the knowledge and experience of the typical user. Users desiring the acquisition of this knowledge must typically turn to texts, programs, and gain experience through hours of interaction with a computer before acquiring even the basic skills needed.

One method utilized to address this concern allows a user to interact with web site creation programs to produce their own web site. However, interaction with these programs still requires basic computer knowledge and familiarity with terms and ideas that in many instances are foreign to a user. Further, these programs typically do not offer the ability to format the web site as the user envisioned it. Rather, the program typically formats the site into a template already created by the program, thereby limiting the user's creativity.

Additionally, a user may wish to take advantage of exposure on the Internet, to have an "Internet presence", even if the user is not Internet connected. For example, a user may own a small business and wish to advertise goods that are available for sale. To advertise the goods, the business owner may wish to have web pages published displaying pictures of available goods and a phone number wherein a caller may contact the business to purchase the goods. The efficacy of such advertising does not require the business owner to be Internet connected. However, many such business owners who are not Internet connected may also be without significant computer knowledge, and therefor may find the creation of an executable, such as a web page, difficult if not impossible to accomplish, thereby requiring the hiring of a programmer.

Further, users may desire to create other executables for use with an information handling system. Automated forms, questionnaires, and other data manipulation and entry methods require even greater knowledge of computer programming and operation to design. Further, even users that have a working knowledge of programming may have difficulty in designing an executable in a manner that closely resembles the desired format. For example, a user may wish to create an automated form similar to the one used by the user in paper form for years. Creating an executable that closely resembles the form may require detailed programming knowledge. This requirement leaves many users with no other alternative than to turn to a professional computer programmer to design the executable, which may be expensive and time consuming.

Thus, it would be desirable to provide a means of creating an executable in which a person may interact and create the executable in a manner readily understandable to a wide range of users.

SUMMARY OF THE INVENTION

Accordingly, the present invention is directed to a system and method for scannable executable design. In a first aspect of the present invention, a system and method for developing an executable includes scanning an image and identifying a representation of a user interface element included in the scanned image. An executable is then formatted to include a user interface element corresponding to the identified representation of the user interface element.

In a second aspect of the present invention, a representation of a user interface element suitable for scanning includes an object representing the user interface element capable of being positioned on a medium. The object is capable of being identified as corresponding to the user interface element so that when the object is scanned, an executable is formatted to include the user interface element corresponding to the identified representation of the user interface element. For example, it may be desirable to include the objects as a kit suitable for sale so as to enable a user without even fundamental computer knowledge to design and create web pages, thereby enabling the user to create an Internet presence.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 7 is an illustration of an exemplary embodiment of the present invention wherein an executable is formatted as an application form.

DETAILED DESCRIPTION OF THE INVENTION

Reference will now be made in detail to the presently preferred embodiments of the invention, examples of which are illustrated in the accompanying drawings.

Referring generally now to FIGS. 1 through 8, exemplary embodiments of the present invention are shown. Designing an executable typically involves a detailed knowledge of computer programming and design. The present invention addresses this problem by providing a system and method of designing executables without the requirement of detailed programming knowledge. Executables include, but are not limited to, web pages, forms, data entry and manipulation screens such as word processors and spread sheets, digital photo albums and slide shows, presentations such as a typical "overhead" presentations, and the like as contemplated by a person of ordinary skill in the art. Executables often contain user interface elements that enable a user to interact with and manipulate data. User interface elements include but are not limited to elements such as labels, text boxes, scroll bars, push buttons, group boxes, slider controls, links between executables, predefined elements, and the like as contemplated by a person of ordinary skill in the art.

Figure 1:
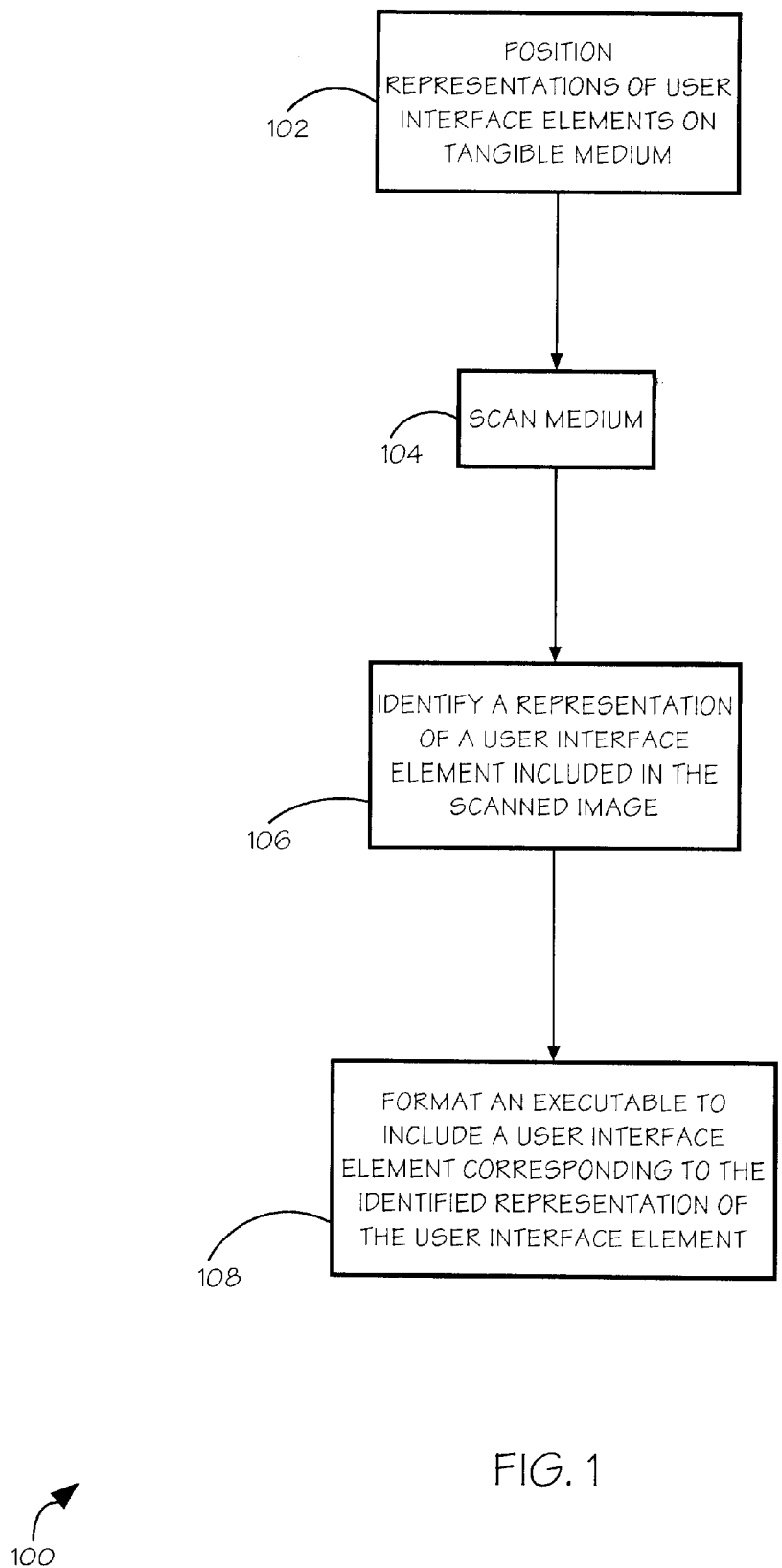
FIG. 1 is a flow diagram depicting an exemplary method of the present invention wherein a user manipulates a tangible medium and representations of user interface elements and then scans the medium to design an executable.

Referring now to FIG. 1, an exemplary method 100 of the present invention is shown wherein a user designs an executable by utilizing a tangible medium 102 and representations of user interface elements 104 and then scans the medium to format an executable. A tangible medium 102, such as paper, plastic sheet, magnetic sheet, and the like, is utilized as a background for an executable. The executable is designed by positioning representations of user interface elements on the tangible medium 102 and then scanning 104 the medium to create an executable. The representations of the user interface elements are identified by the system 106 whereupon the system formats the executable 108 to include the user interface element corresponding to the identified representation of the user interface element. It may be desirable for the system to format the executable 108 in a direct and/or a deduced correlation. For example, the system may identify a direct correlation, such as correlating a representation to a specific user interface element, as well as a deduced correlation, such as formatting the user interface element to correspond to the position of the representation on the medium. In this way, a user with little or no programming knowledge may design an executable and have the executable correspond closely to the format desired by the user.

Figure 2:
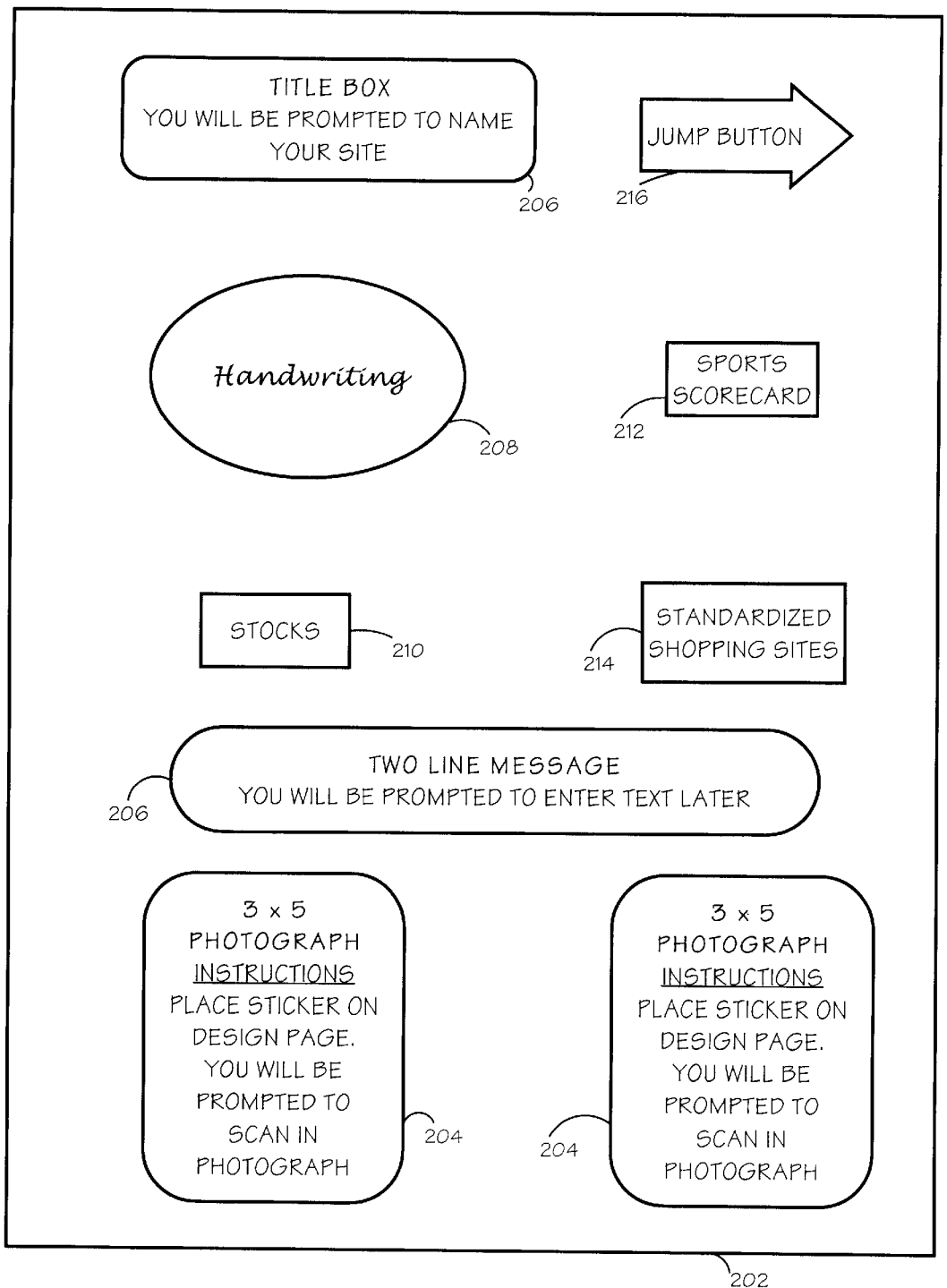
FIG. 2 is an illustration of an exemplary embodiment of the present invention wherein a tangible medium and representations of user interface elements are utilized to design an executable formatted as a web page.

Referring now to FIG. 2, an exemplary embodiment 200 of the present invention is shown wherein a tangible medium and representations of user interface elements are utilized to design a web page. A tangible medium 202, such as paper, plastic sheet, magnetic sheet, and the like, may be utilized as a background for the web page. The user, to design the web page, may position representations of user interface elements on the tangible medium. Representations may be formed as objects capable of being positioned on the medium to represent the user interface element. For instance, a representation may be formed as a sticker to be applied to a paper medium, magnetic object to be placed on a magnetic medium, a removable piece of plastic that electrostatically bonds to a plastic sheet, and the like as contemplated by a person of ordinary skill in the art. It may be desirable to format the tangible medium to include a grid so as to enable a user to properly align the representation on the medium. The grid may be formatted so as not to appear on the finished executable, such as by utilizing a special color, pattern, and the like that is identified by the system. Further, a transparent covering may be included with the medium to assist the user in proper alignment and placement of the representations of user interface elements.

Representations of photographs 204 to be included on the web page may be positioned on the medium 202. Therefore, the representations 204 may define the position of the desired photographs. Text boxes 206 may also be utilized to define an area in which a user wished to enter text. Thus, a user may define a position for a user interface element by positioning a representation of that element on the medium 202. After the medium 202 is scanned, an information handling system may prompt the user to enter the desired text for each defined area, thereby greatly simplifying the design process. It may be desirable to include handwritten user data, such as text, on the representation 208 that then may be identified by the system using optical character recognition (OCR). For example, the system may identify handwritten indicia on a representation 208 and format the user interface element corresponding to the representation to include indicia in a corresponding font.

Predefined user interface elements may also be provided to enable specified functionality to the web page. For example, a user interface element may enable an automatic link to stock news 210 so that the information may be displayed on the web page. Additionally, sports scores 212 as well as shopping sites 214 may be provided so that a user may easily format a web page to include desired characteristics. Further, user interface elements may be furnished to provide a link 216 to an additional user designed web page. By utilizing the present invention, a user may design a web page containing user-interface elements without having the requisite programming knowledge previously required.

User interface elements may be identified utilizing a wide variety of methods and not depart from the spirit and scope of the present invention. In an exemplary embodiment, characteristics of the user interface element may be utilized to identify the user interface element. Identification characteristics may include color, shape, texture, size, border style, optical indicia included by the user interface element, and the like as contemplated by a person of ordinary skill in the art. It may be preferable to have a different characteristic identify each type of user interface element. For example, as shown in FIG. 2, user interface elements with rounded edges 204 and 206 indicate user interface elements that require additional actions by the user, such as scanning in a photograph or the entry of text. Rectangles may be utilized to identify predefined links 210, 212, and 214 and an arrow shape may be used to identify a link 216 to another executable. In an exemplary embodiment, a database of representations corresponding to user interface elements may be utilized to identify the representation. For example, a characteristic, such as optical indicia including a bar code, may be utilized to format a user interface element in hypertext markup language code line.

Additionally, a second tangible medium may be utilized as a support for supplying additional data in an additional exemplary embodiment of the present invention. A second sheet may be utilized to supply additional information, such as a background for the executable, additional photos to be used in a slide show, an amount of time a photo is shown in a slide show, Metatag data, the architecture of a web site, properties such as font size, animation and morphing, and the like. For example, a representation 204 may require the scanning of additional photos for inclusion on the web site. These additional photos may be supplied on a support medium for scanning. Further, textual information may be supplied on the support medium to be included on the web page corresponding to the representation 206. For example, a representation of a user interface element may be too small to enter all of the desired text by hand. Therefore, a user may utilize a representation indicating the additional information to be inputted is contained on the support medium, such as a representation including a "z" instructing the system to input the corresponding "z" representation information on the support medium.

Furthermore, representations of each page to be utilized in a web site may be positioned on a support sheet to supply a format for the architecture of the web site. For instance, representations of each web page may be positioned with arrows from each representation indicating how the pages are to be linked. In this way, the architecture of an executable may be supplied in an intuitive and efficient manner. It should be apparent that a variety of additional data, such as data not inherent on the first tangible medium, may be supplied by a support medium and not depart from the spirit and scope of the present invention, the previous examples merely an exemplary embodiments thereof.

Figure 3:
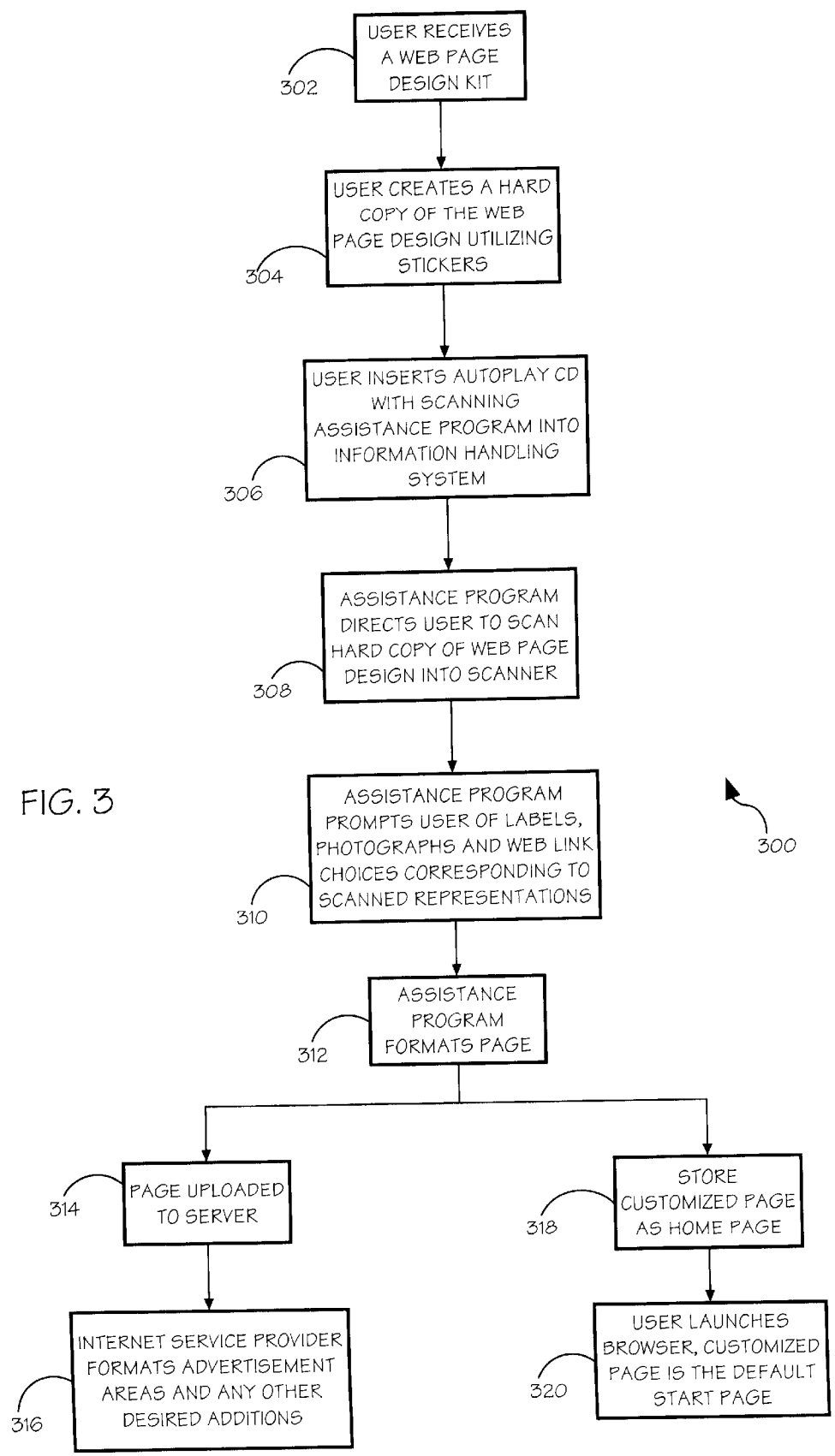
FIG. 3 is a flow diagram depicting an exemplary method of the present invention wherein a user creates an executable formatted as a web page, the user being prompted by an information handling system to enter user defined information.

Referring now to FIG. 3, an exemplary method 300 of the present invention is shown wherein a user creates an executable formatted as a web page, the user being prompted by an information handling system to enter user defined information. A user receives a web page design kit 302. The web page design kit includes a medium and representations of user interface elements to enable the user to design a web page utilizing a medium that is readily understandable. The user then creates a hard copy of the web page design utilizing representation of user interface elements formed as "stickers" 304.

The user may then insert an AutoPlay CD or like media containing a scanning assistance program into an information handling system 306. The assistance program may be capable of assisting the user in scanning the hard copy of the web page design with a scanner 308, such as by indicating to the user the desired orientation of the medium in the scanner, and when to insert additional media into the scanner. If the scanned image contains user interface elements requiring additional information the assistance program may prompt the user to enter the information 310. For example, the image may contain photographic boxes 204 (FIG. 2) and then prompt the user to place the desired photographs on the scanner to be scanned by the information handling system. The assistance program may then format the web page 312 including user interface elements corresponding to representations included on the hard copy. Prompting may also include system commands based on the identified representation. For example, a representation may be identified wherein a thumbnail image and an expanded view are desired. Therefore, the system upon identifying the representation may prompt the scanner and assistance program to create both images while the desired image is available to the scanner, thereby improving the efficiency of the design process.

The formatted page may then be uploaded to a server 314 if the user has an Internet Service Provider (ISP) wherein the ISP may include advertisement areas and any other desired and/or necessary additions to the web page. For example, an Internet Service Provider (ISP) may form an agreement with the user in which the user receives free display of the web page on the Internet if the user allows the ISP to include advertisements on the web page. Additionally, the user may store the customized page as a home page on the user's information handling system 318 so that as the user launches the browser, the customized page is the default start page 320.

In another exemplary embodiment, a user may form the hard copy of the web page and then send the hard copy to an Internet service provider (ISP) for scanning, formatting, and uploading so that the web page is accessible on the Internet. Thus, even a user without immediate access to an information handling system may design a web page in an intuitive manner. A hard copy may also be utilized to verify the formatting of the web page. For example, a user may place the desired representations on a medium and perform the scan. A printout of the web page may then be supplied to verify the formatting of the web page. Additionally, a printout may be utilized to make changes to the web page. For instance, the printout may be used as a template for later updates, so that a user may place a new representation over previous representations contained on the medium so that the medium may be rescanned to arrive at the updated web page. It may be desirable to update an executable by including only the newly identified representations and other changes.

Figure 4:
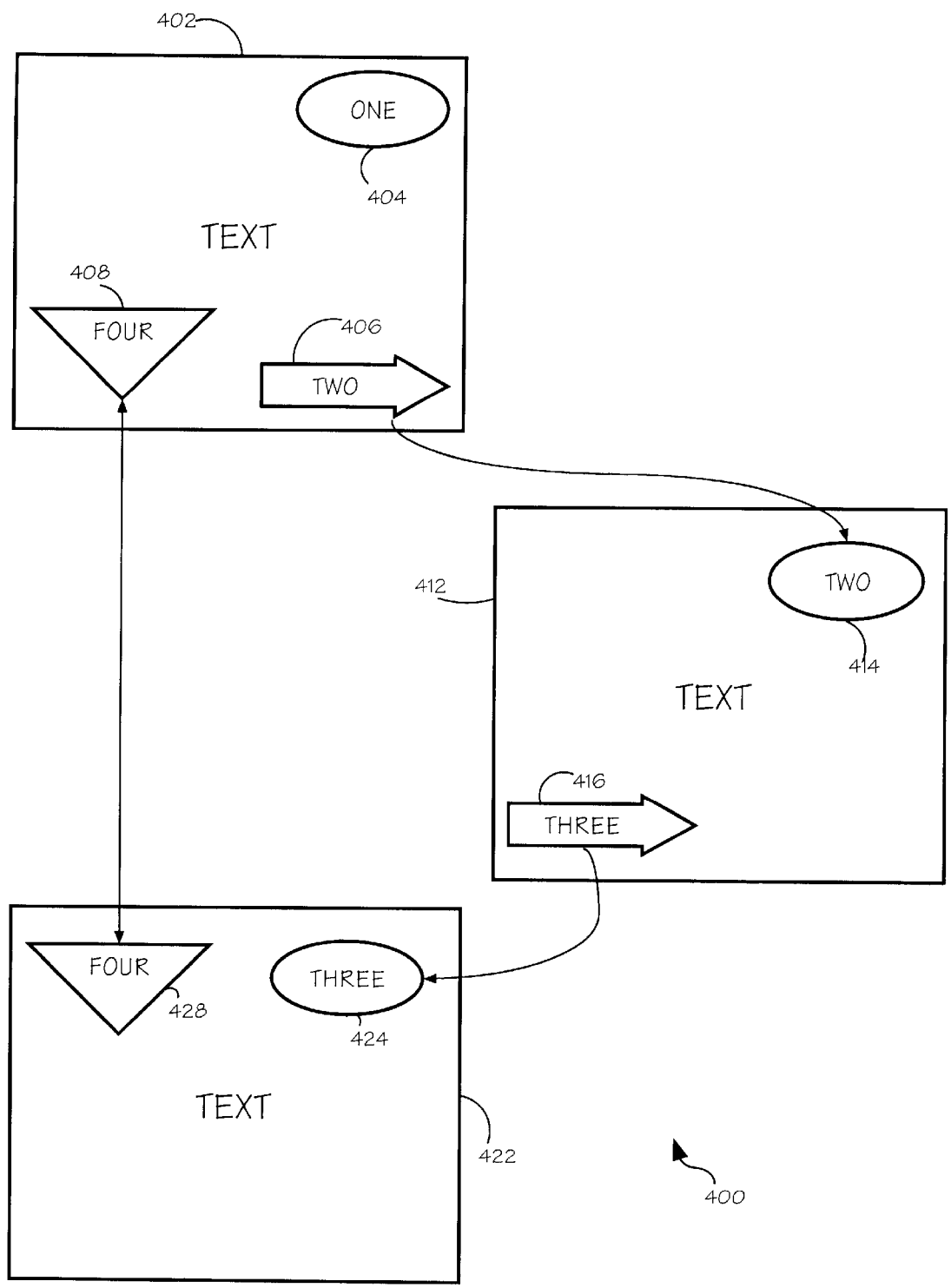
FIG. 4 is an illustration of an exemplary embodiment of the present invention wherein linking between user created pages utilizing representations of user interface elements is shown.

Referring now to FIG. 4, an exemplary embodiment of the present invention wherein linking between user created pages utilizing representations of user interface elements is shown. A user may create a plurality of linked executables utilizing representations of user interface elements of the present invention. For example, a user may wish to create three linked web pages. The user may utilize three pieces of media to define the first web page 402, second web page 412, and third web page 422. Each piece of media may be identified with a user interface element to indicate the interrelationship of the various media. For example, a first representation 404 may indicate the first page, which may be considered the home page, a second representation 414 indicating a second web page, and a third representation 424 indicating a third web page.

Representations of user interface elements utilized as a link may be used to indicate the interrelationship of the web pages. For instance, a link representation 406 with a "two" on it may indicate that the user wishes to provide a link from the first web page to the second web page. Additionally, a link representation 416 with a "three" on it may indicate that the user wished to provide a link from the second web page 412 to the third web page 422. An additional type of link may be desired in which the user wants to provide a two-way link between pages, so that a first representation 408 may provide a link to a web page including the second representation 428 and vice versa. Thus, the user may design a plurality of web pages including links between the web pages, as the user desires. Although numbered optical indicia are described, it should be apparent that a variety of indicia, such as bar codes and the like, and characteristics, such as radio frequency (RF) tags, may be utilized to indicate desired links without departing from the spirit and scope of the present invention.

Figure 5A:
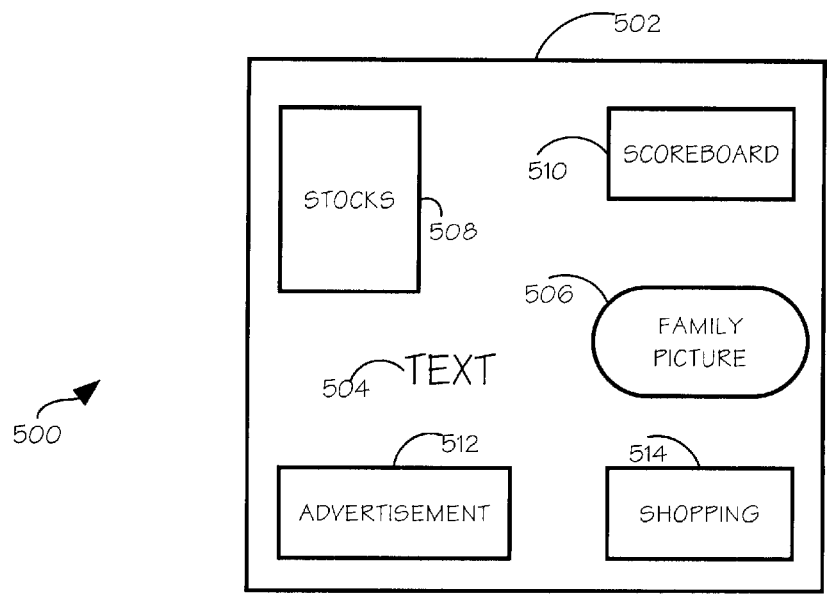
FIGS. 5A and 5B are illustrations of exemplary embodiments of the present invention wherein predefined user interface elements are utilized to include desired information gained from an executable linked to the desired executable.
Figure 5B:
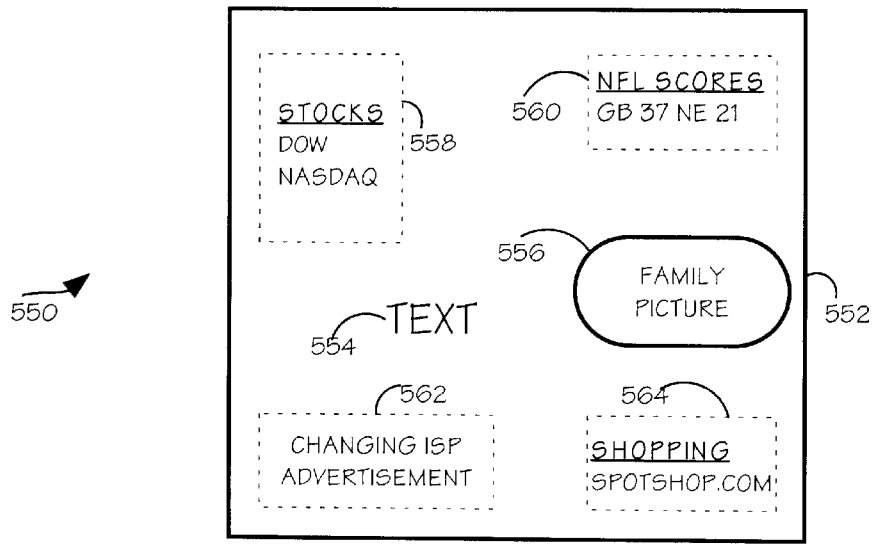

Referring now to FIGS. 5A and 5B, exemplary embodiments of the present invention are shown wherein predefined user interface elements are utilized to include desired information gained from an executable linked to the desired executable. The inclusion of predefined user interface elements may enable a user to include the corresponding predefined data on the executable. For example in FIG. 5A, an exemplary embodiment 500 is shown wherein a user utilizes a plurality of predefined user interface elements to include the corresponding functionality of the element to the executable. A medium 502 is provided including user entered text 504 and a picture 506. Additionally, pluralities of predefined user interface elements are included to add desired information to the executable formatted as a web page. Examples of predefined user interface elements include stocks 508, scoreboard 510, advertisement 512, and shopping links 514.

Therefore, a user may create a customized web page containing updated information provided from linked sites, an exemplary embodiment 550 of which is shown in FIG. 5B. In this exemplary embodiment, the medium 502 of FIG. 5A is scanned and formatted to a corresponding web page 552. User interface elements, such as userentered text 554 and a picture 556, are included on the web page 552. Additionally, data and functionality corresponding to the representations in FIG. 5A are formatted and displayed on the web page 552. For example, stock information 558, sports scores 560, advertisements 562 provided by the Internet service provider (ISP) and shopping links 564 are formatted for display on the web page. Thus, it may be desirable for a provider of an executable design kit, such as a web design kit, of the present invention to include predefined user interface elements of advertisers and other web sites for a fee as an additional source of revenue. For example, a web site design kit may require the inclusion of an advertisement with the user-designed site for the user-designed site to become operational. The provider, as a source of revenue, may utilize the inclusion of the advertisement in the user's web page.

Figure 6:
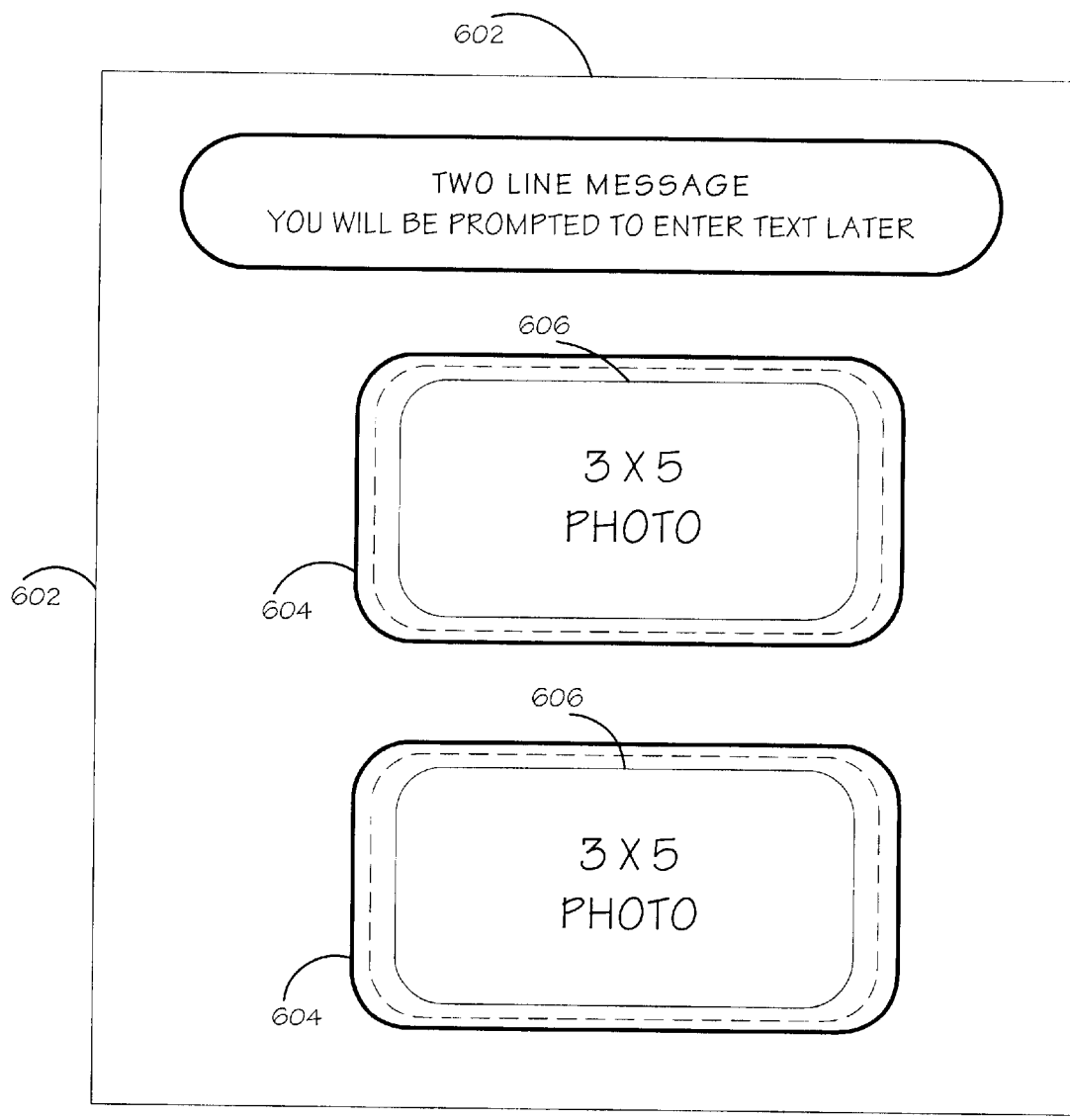
FIG. 6 is an illustration depicting an exemplary embodiment of the present invention wherein a border is utilized to define a representation of a user interface element.

Referring now to FIG. 6, an exemplary embodiment 600 is shown wherein a border is utilized to define a user interface element. A border may be utilized to define a user interface element so that the user interface element may be manipulated once formatted by the system. For example, the border 604 may be applied as tape surrounding a photograph 606 for identifying the photograph as a user interface element. Thus, an image of the photograph may be formatted by an information handling system to provide functionality corresponding to the user interface element. For example, the photograph may be identified by the border as a link to another web page, so that a user may utilize the photo as a link to the desired page. It may be desirable to eliminate the appearance of the border from the formatted executable, the border in this instance being used to merely identify the executable. A variety of user interface elements may be defined by the border style and not depart from the spirit and scope of the present invention. For example, the border style may define a property such as font size, morphing of a first image to a second image, animation of a plurality of images, and the like.

Executables may be formatted for a wide variety of applications and functions and not depart from the spirit and scope of the present invention. For example, in FIG. 7, an exemplary embodiment 700 of the present invention is shown wherein an executable is formatted as an application form. The executable 702 may contain a variety of user interface elements to provide the desired functionality, which may provide a wide range of functions. For example, a user wishing to design an application form corresponding to an existing application form contained on a medium, such as paper, need only add representations of user interface elements, such as text entry boxes 704 and 706, and slider bars 708 and 710, to convert the hard copy to an executable capable of being utilized on an information handling system. For instance, tape may be used to define a text entry user interface element on the paper form. Thus, as the paper form is scanned, the tape may be identified as a text entry box in the formatted executable. It may be desirable to include optical indicia on the representation so that when the executable is utilized, any data entered into the text entry box may be stored in a corresponding location capable of being accessed by another executable. For example, a loan application form 702 is depicted in FIG. 7. The data entered into text entry boxes may be identified so that another executable, such as a loan processing application, may identify the desired information, such as name 704 and work phone number 706. In this way, the data may be shared by a wide variety of executables. Additionally, other user interface objects, such as slider bars 708 and 710, may be included to add additional functionality to the executable.

Figure 8:
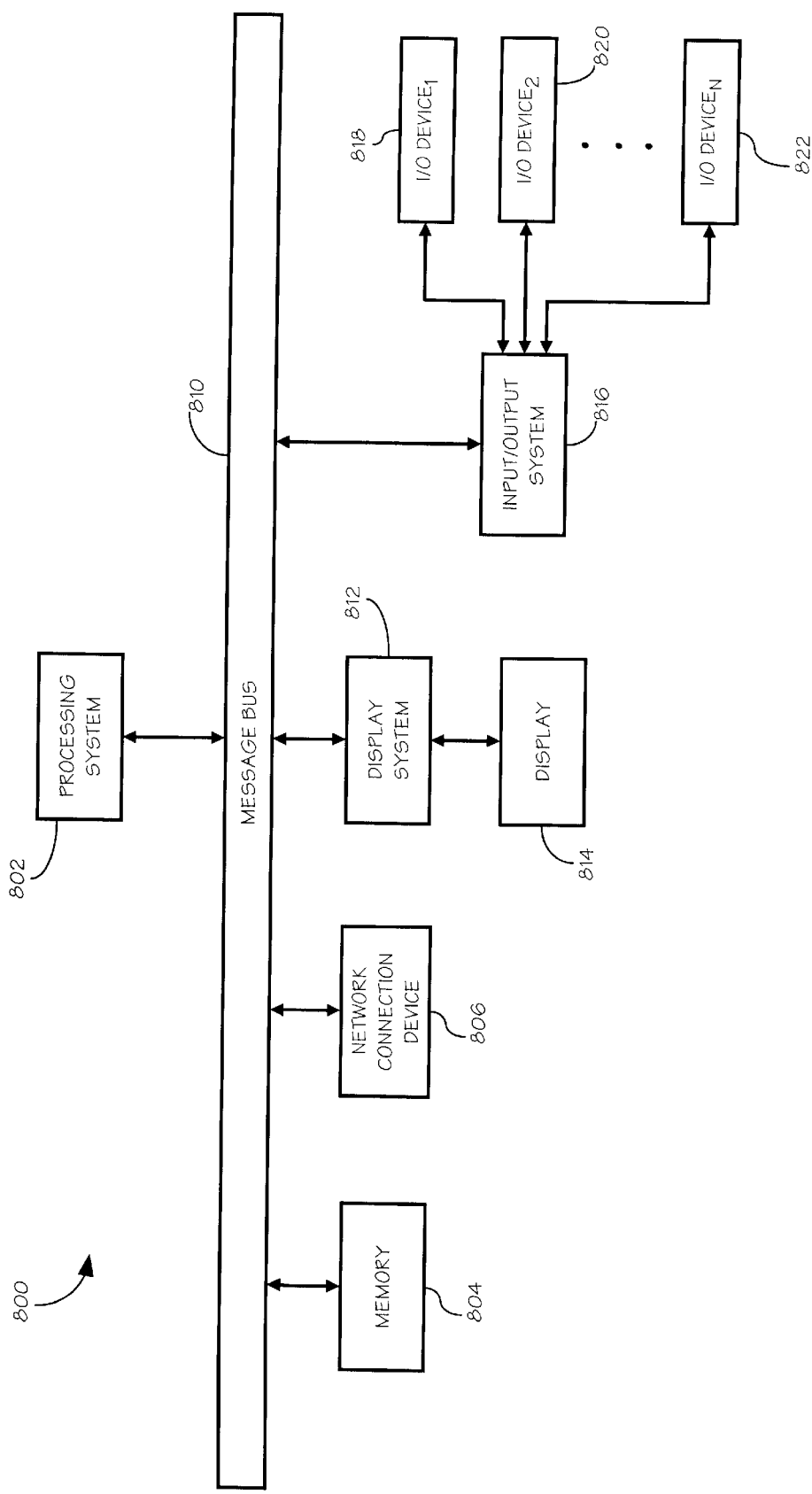
FIG. 8 is a block diagram of an information handling system operable to embody the present invention.

Referring now to FIG. 8, a hardware system in accordance with the present invention is shown. The hardware system shown in FIG. 8 is generally representative of the hardware architecture of an information handling system of the present invention. A controller, for example, a processing system 802, controls the information handling system 800. The processing system 802 includes a central processing unit such as a microprocessor or microcontroller for executing programs, performing data manipulations and controlling the tasks of the information handling system 800. Communication with the processing system 802 may be implemented through a system bus 810 for transferring information among the components of the information handling system 800. The system bus 810 may include a data channel for facilitating information transfer between storage and other peripheral components of the information handling system 800. The system bus 810 further provides the set of signals required for communication with processing system 802 including a data bus, address bus, and control bus. The system bus 810 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-600, and so on. Furthermore, the system bus 810 may be compliant with any promulgated industry standard. For example, the system bus 810 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access bus, IEEE P6394, Apple Desktop Bus (ADB), Concentration Highway Interface (CHI), Fire Wire, Geo Port, or Small Computer Systems Interface (SCSI), for example.

Additionally, the information handling system 800 includes a memory 804. In one embodiment, memory 804 is provided on SIMMs (Single In-line Memory Modules), while in another embodiment, memory 804 is provided on DIMMs (Dual In-line Memory Modules), each of which plugs into suitable sockets provided on a motherboard holding many of the other components shown in FIG. 8. Memory 804 includes standard DRAM (Dynamic Random-Access Memory), EDO (Extended Data Out) DRAM, SDRAM (Synchronous DRAM), or other suitable memory technology. Memory 804 may also include auxiliary memory to provide storage of instructions and data that are loaded into the memory 804 before execution. Auxiliary memory may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM).

The information handling system 800 further includes a network connection device 806. The network connection device 806 communicates between the information handling system 800 and a remote device, such as external devices, networks, information sources, or host systems that administer a plurality of information handling systems. For example, host systems such as a server or information handling system, may run software controlling the information handling system, serve as storage for an information handling system, or coordinate software running separately on each information handling system. The network connection device 806 may provide or receive analog, digital, or radio frequency data. The network connection device 806 preferably implements industry promulgated architecture standards, including Recommended Standard 232 (RS-232) promulgated by the Electrical Industries Association, Infra-red Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.66 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network connection device 806 may comprise a network adapter, a serial port, parallel port, printer adapter, modem, universal asynchronous receiver-transmitter (UART) port, and the like, or use various wireless technologies or links such as an infrared port, radio-frequency (RF) communications adapter, infrared transducers, or RF modem.

The information handling system 800 further includes a display system 812 for connecting to a display device 814. The display system 812 may comprise a video display adapter having all of the components for driving the display device, including video random access memory (VRAM), buffer, and graphics engine as desired. The display device 814 may comprise a liquid-crystal display (LCD), or may comprise alternative type of display technologies, such as a light-emitting diode (LED) display, gas or plasma display, or employ flat-screen technology.

An information handling system 800 may further include an input/output (I/O) system 816 for connecting to one or more I/O devices 818, 820 up to N number of I/O devices 822. Input/output system 816 may comprise one or more controllers or adapters for providing interface functions between one or more of I/O devices 818–822. For example, input/output system 816 may comprise a serial port, parallel port, network adapter, printer adapter, radio-frequency (RF) communications adapter, universal asynchronous receiver-transmitter (UART) port, and the like, for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, and the like. It should be appreciated that modification or reconfiguration of the information handling system 800 of FIG. 8 by one having ordinary skill in the art would not depart from the scope or the spirit of the present invention.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory 804 of one or more information handling systems configured generally as described in FIG. 8. Until required by the information handling system, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of an information handling system and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order, or hierarchy of steps in the method can be rearranged while remaining within the scope of the present invention. The attached method claims present elements of the various steps in a sample order, and are not meant to be limited to the specific order or hierarchy presented.

It is believed that the scannable executable design of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for developing an executable, comprising:
   scanning an image;
   identifying a representation of a user interface element included in the scanned image;
   formatting the executable to include the user interface element corresponding to the identified representation of the user interface element;
   scanning a second image;
   identifying a second representation of a second user interface element included in the scanned second image; and
   formatting the executable to include the second user interface element corresponding to the identified second representation of the second user interface element;

wherein the user interface element and the second user interface element identify a link between the user interface element and the second user interface element, formatting a first executable corresponding to the scanned image to include a link to a second executable corresponding to the second scanned image.

2. The method as described in claim 1, wherein the user interface element includes at least one of a label, text box, scroll bar, button, group box, slider control, link and predefined element.

3. The method as described in claim 1, wherein the executable is at least one of a web page, form, data entry and manipulation screen, digital photo album, slide show, and presentation.

4. The method as described in claim 1, wherein the representation of the user interface element is identified by at least one of color, shape, texture, size, border style and optical indicia.

5. The method as described in claim 1,
wherein the image is included on a medium suitable for being manipulated by a user.

6. The method as described in claim 5, wherein the representation of the user interface element includes an object capable of being positioned on the medium wherein the object is capable of being identified so as to correspond to the user interface element so that when the object is scanned, the executable may be formatted to include the user interface element corresponding to the identified representation of the user interface element.

7. The method as described in claim 5, further comprising a support medium, the support medium suitable for providing supplemental information.

8. The method as described in claim 5, wherein the medium is a tangible medium.

9. The method as described in claim 8, wherein the representation of the user interface is associated with an object capable of being positioned on the medium.

10. The method as described in claim 9, wherein the object is a tangible object selected from a group consisting of a sticker, a magnetic object, and a removable plastic object which is subject to electrostatic forces.

11. The method as described in claim 5, wherein the medium is a tangible medium selected from a group consisting of paper, plastic sheets, and a magnetic medium.

12. The method as described in claim 1, further comprising prompting a user to enter additional data related to the user interface element.

13. The method as described in claim 12, wherein the additional information is entered by at least one of scanning typing and data download.

14. A program of instructions storable on a medium readable by an information handling system for causing the information handling system to execute steps for designing an executable, the steps comprising:
scanning an image;
identifying a representation of a user interface element included in the scanned image;
formatting the executable to include the user interface element corresponding to the identified representation of the user interface element;
scanning a second image;
identifying a second representation of a second user interface element included in the scanned second image;
formatting the executable to include a second user interface element corresponding to the identified second representation of the second user interface element;
wherein the user interface element and the second user interface element identify a link between the user interface element and the second user interface element, formatting a first executable corresponding to the scanned image to include a link to a second executable corresponding to the second scanned image.

15. The program of instructions as described in claim 14, wherein the user interface element includes at least one of a label, text box, scroll bar, button, group box, slider control, link and predefined element.

16. The program of instructions as described in claim 14, wherein the executable is at least one of a web page, form, data entry and manipulation screen, digital photo album, slide show, and presentation.

17. The program of instructions as described in claim 14, wherein the representation of the user interface element is identified by at least one of color, shape, texture, size, border style and optical indicia.

18. The program of instructions as described in claim 11, wherein the image is included on a medium suitable for being manipulated by a user.

19. The program of instructions as described in claim 18, wherein the representation of the user interface element includes an object capable of being positioned on the medium wherein the object is capable of being identified so as to correspond to the user interface element so that when the object is scanned, the executable may be formatted to include the user interface element corresponding to the identified representation of the user interface element.

20. The program of instructions as described in claim 18, further comprising a support medium, the support medium suitable for providing supplemental information.

21. The program of instructions as described in claim 18, wherein the medium is a tangible medium.

22. The program of instructions as described in claim 21, wherein the representation of the user interface is associated with an object capable of being positioned on the medium.

23. The program of instructions as described in claim 22, wherein the object is a tangible object selected from a group consisting of a sticker, a magnetic object, and a removable plastic object which is subject to electrostatic forces.

24. The program of instructions as described in claim 18, wherein the medium is a tangible medium selected from a group consisting of paper, plastic sheets, and a magnetic medium.

25. The program of instructions as described in claim 14, further comprising prompting a user to enter additional data related to the user interface element.

26. The program of instructions as described in claim 25, wherein the additional information is entered by at least one of scanning, typing and data download.

27. An information handling system, comprising:
a processor for executing a program of instructions on the information handling system;
a scanner coupled to the processor; and
a memory coupled to the processor for storing the program of instructions executable by said processor; wherein the program of instructions configures the information appliance to scan an image;
identify a representation of a user interface element included in the scanned image;
format an executable to include the user interface element corresponding to the identified representation of the user interface element;
scan a second image;
identify a second representation of a second user interface element included in the scanned second image; and format the executable to include the second user interface element corresponding to the identified second representation of the second user interface element;

wherein the user interface element and the second user interface element identify a link between the user interface element and the second user interface element, formatting a first executable corresponding to the scanned image to include a link to a second executable corresponding to the second scanned image.

28. The information handling system as described in claim 27, wherein the user interface element includes at least one of a label, text box, scroll bar, button, group box, slider control, link and predefined element.

29. The information handling system as described in claim 27, wherein the executable is at least one of a web page, form, data entry and manipulation screen, digital photo album, slide show, and presentation.

30. The information handling system as described in claim 27, wherein the representation of the user interface element is identified by at least one of color, shape, texture, size, border style and optical indicia.

31. The information handling system as described in claim 27,
wherein the image is included on a medium suitable for being manipulated by a user.

32. The information handling system as described in claim 31, wherein the representation of the user interface element includes an object capable of being positioned on the medium wherein the object is capable of being identified so as to correspond to the user interface element so that when the object is scanned, the executable may be formatted to include the user interface element corresponding to the identified representation of the user interface element.

33. The information handling system as described in claim 31, further comprising a support medium, the support medium suitable for providing supplemental information.

34. The information handling system as described in claim 31, wherein the medium is a tangible medium.

35. The information handling system as described in claim 34, wherein the representation of the user interface is associated with an object capable of being positioned on the medium.

36. The information handling system as described in claim 35, wherein the object is a tangible object selected from a group consisting of a sticker, a magnetic object, and a removable plastic object which is subject to electrostatic forces.

37. The information handling system as described in claim 31, wherein the medium is a tangible medium selected from a group consisting of paper, plastic sheets, and a magnetic medium.

38. The information handling system as described in claim 27, further comprising prompting a user to enter additional data related to the user interface element.

39. The information handling system as described in claim 38, wherein the additional information is entered by at least one of scanning, typing and data download.

* * * * *